United States Patent

[11] 3,620,375

| [72] | Inventor | Jack Atkins<br>4408 Cherrydale Road, Memphis, Tenn. 38111 |
|---|---|---|
| [21] | Appl. No. | 856,011 |
| [22] | Filed | Sept. 8, 1969 |
| [45] | Patented | Nov. 16, 1971 |

[54] FILTER CONSTRUCTED OF METALLIC MATERIAL
2 Claims, 5 Drawing Figs.

[52] U.S. Cl. .................................................. 210/484, 210/489, 210/493, 210/495, 210/500, 55/497
[51] Int. Cl. .................................................. B01d 25/06
[50] Field of Search .......................................... 210/489, 493, 495, 509, 510, 484, 500; 55/497, 301, 525, 526, DIG. 31

[56] References Cited
UNITED STATES PATENTS

| 1,676,191 | 7/1928 | Jordahl | 55/526 |
| 2,008,800 | 7/1935 | Somers | 55/497 |
| 2,327,184 | 8/1943 | Goodloe | 210/489 X |
| 2,965,197 | 12/1960 | Dow et al. | 55/DIG. 31 |
| 3,125,427 | 3/1964 | Smith et al. | 55/525 X |
| 3,513,643 | 5/1970 | Tarala | 210/493 X |

OTHER REFERENCES

" Metal Fibre Filter Media for Micron Range Duties" in Filtration & Separation, July/Aug. 1969, pages 413 and 414, 210/510.

*Primary Examiner*—John Adee
*Attorney*—Paul M. Denk

ABSTRACT: In a filter for use in removing entrained matter contained in a flowing material, a series of superimposed layers of a metallic filtering composition forms an inner core that is encased intermediate a pair of outer coverings to form the filter element, said filter element being corrugated to enhance its exposed surface area during the filtering operation, and a rigid frame circumscribes the filter element providing rigidity in the construction of the filter.

PATENTED NOV 16 1971      3,620,375
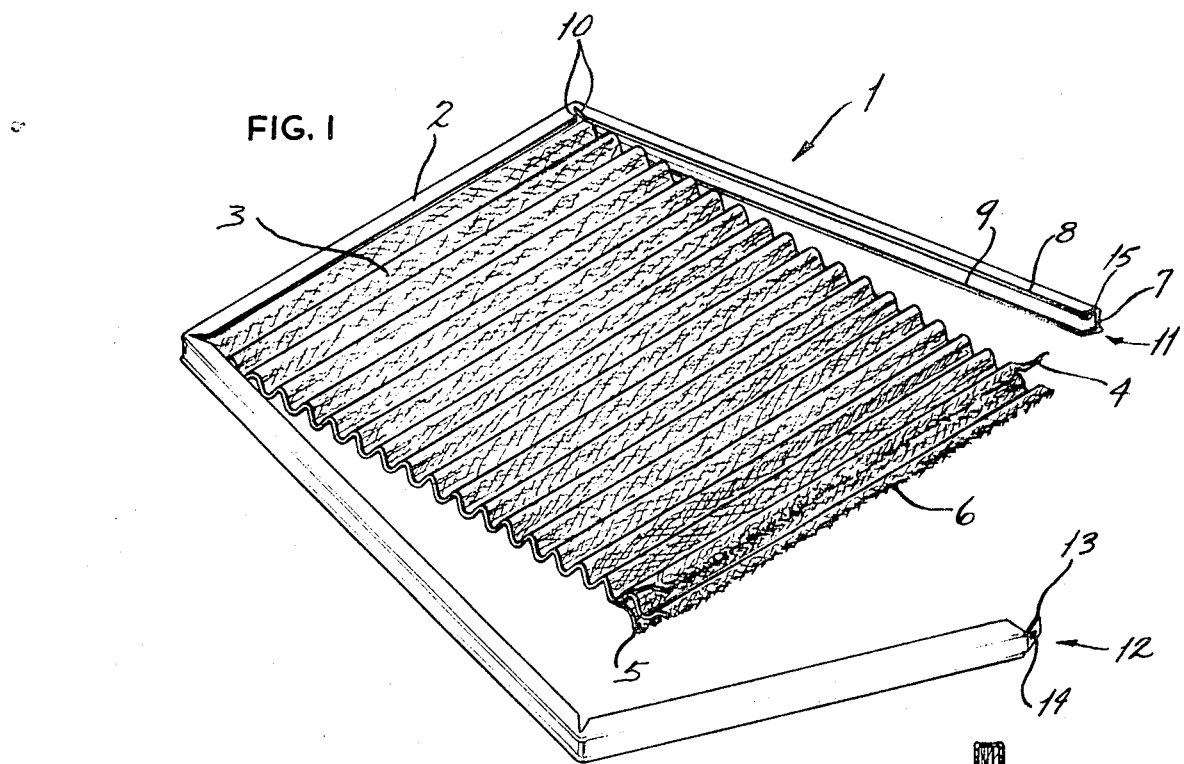
FIG. 1
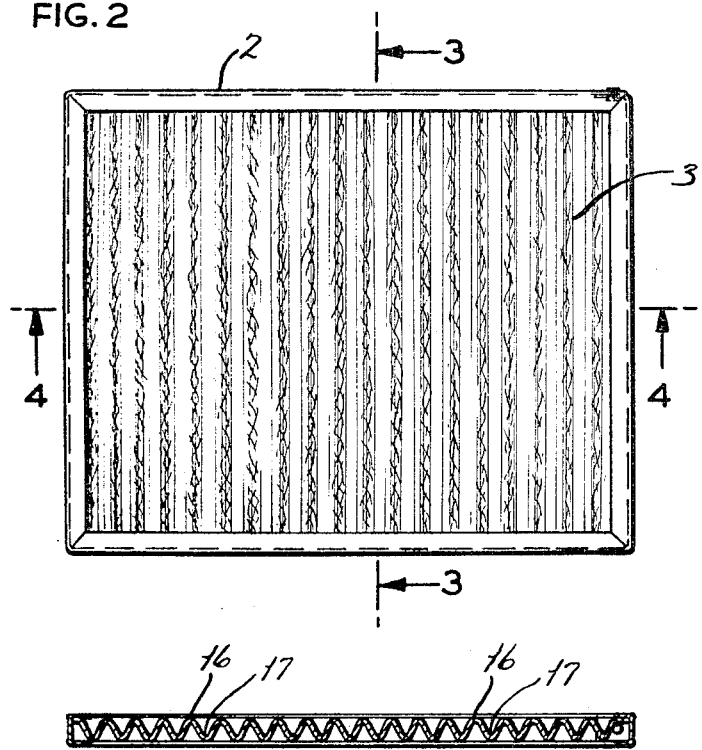
FIG. 2
FIG. 4
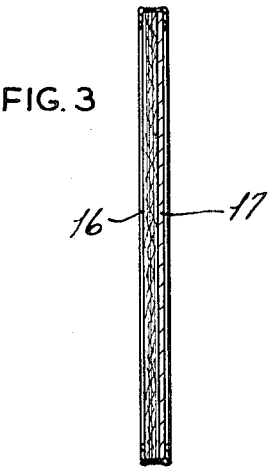
FIG. 3
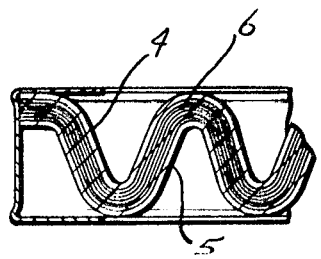
FIG. 5
INVENTOR
JACK ATKINS
BY
Paul M. Denk
ATTORNEY

FILTER CONSTRUCTED OF METALLIC MATERIAL

BACKGROUND OF THE INVENTION

This invention relates generally to a filter, and more particularly, relates to a filter constructed of metallic material which is corrugated which effectively increases its surface area that is exposed to the flowing material desired to be filtered.

Numerous filters have been devised for providing means for removing dust particles, or the like, from air or other flowable material, and such filters have generally been constructed of paper, and other related materials, and more recently have been constructed of spun fibers that are retained within a frame. These prior art filters are effective mainly when used in association with the filtering of mildly flowing air, or other gases, but they generally are inherently weak when used in conjunction with the filtering of other fluids, such as those having liquidity. Furthermore, these earlier filters are generally used for a period of time until they become soiled or restraining of movement of the flowing material due to their absorption and retaining of dirt particles removed from the same. When such occurs, these filters are usually discarded since they are of such weak construction that they cannot withstand the strain of exposure and pressure of the various cleaning processes. Also, many of the filters, such as those constructed having a paper or other fiber element, cannot be soaked in a solvent to achieve cleaning since this generally destroys the filtering characteristic of the same.

Those prior art filters that are constructed having a filter element formed of metal generally include a filter formed having just a flat surface that is disposed within the path of the flowing material to achieve some removal of its impurities. Obviously, an increase in the surface area that is exposed to the flowing material, whether it be air or any form of liquid, will not only effectively remove any impurities from the flowing composition, but due to the increase in the size of area in the filter element, the flowing material will be able to more freely and rapidly pass through the filter than can be achieved by passing a fluid through a filter having a flat surface filtering element.

It is therefore, an object of this invention to provide a filter formed having a filter element which is corrugated to effectively increase the surface area that is exposed to the flowing material to be cleaned.

It is another object of this invention to provide a filter that is constructed having an inner core made of a metallic composition so that the filter may be cleaned in any of a variety of solvents whenever it becomes congested with dirt or other similar particles removed during the filtering process.

It is a further object of this invention to provide a filter having a filter element which is constructed of corrugated sheets of expanded metal that effectively remove entrained matter from a flowing material such as air.

It is a further object of this invention to provide a filter having a filter element constructed of expanded metal wherein the inner core is encased within an outer covering formed of a more rigid metallic substance to enhance the structural support in that area of the filter which receives the full force of the air or other fluid being cleansed.

It is another object of this invention to provide a filter including an outer frame formed having a web and depending flanges which effectively cover the rough edges of the metallic filter element while further adding rigidity and structural support to the entire filter.

It is an additional object of this invention to provide a filter having a filter element whose edges are pressure bonded during their dimension cutting so that said element will maintain its integrity even when removed from its frame.

Another object of this invention is to provide a process for corrugating a filter element so as to effectively increase its surface area, with said element being pressure bonded into an integral construction as when being cut so that it maintains its integrity even when removed from its frame.

A further object of this invention is to provide a filter which is easily constructed and due to its method of manufacture will resist rough handling which insures a longer useful life.

Other objects will become apparent to those skilled in the art in the light of the following description and accompanying drawing.

SUMMARY OF THE INVENTION

This invention relates to a filter which is useful for separating entrained matter, such as dirt particles or other forms of minute particles that may be carried by a flowing material such as air, liquid, or the like, said filter being formed having a metallic filtering element encased within a rigid frame. The filter element is constructed having an inner core of a metallic filtering composition, formed from such materials as layers of expanded metal sheets laid one upon the other, sheets of porous or foraminous metal, or even an agglomeration of the turnings or shavings that are acquired from the standard operations of a lathe, said inner core being encased within a pair of outer coverings which are constructed of a more sturdy thickness of expanded metal so as to provide rigidity to the filter element itself. The entire filter element is then exposed to a corrugating process wherein its surface area takes on a serpentinelike appearance which effectively increases the exposed surface area of the filter element. The significance of this type of arrangement in a filter element is that flowing material, such as air or a liquid, may more easily and quickly pass through a filter having a greater surface area within a frame of particular exterior dimensions than can pass through a filter of the same dimensions having a flat or planar filtering element. The entire filter element as formed, is then cut to the dimensions desired, and in the cutting process the severed edges of the metallic sheet material are pressure bonded together into an integral unit which retains its integrity and shape, and sustains the overlying relationship of the layers of sheet material even though the outer frame may not as yet have been placed around the element, or even when the element is removed from said frame.

As an example of the effective increase in the surface area of a filter subjected to a corrugating process, in a filter having dimensions of approximately 16 inches by 20 inches, and whose filter element is exposed to a three-quarter inch depth corrugating machine, when the filter element is once again expanded into a flat configuration, its 20 inch length can be expanded to approximately 36 inches, indicating that effective surface area of this particular size filter can perform just as efficiently as a filter having a flattened filter element which has a length of approximately 36 inches, instead of 20 inches. Thus, a filter element formed in accordance with this invention may be made of greatly reduced size but can perform just as effectively as the more larger and cumbersome filters. Furthermore, since the filter of this invention is constructed of metallic materials, it not only retains its shape for a much greater length of time, but it may be easily cleaned of its fine dirt or other dust particles accumulated during the filtering operation, and once again be reused just as effectively as a new filter. The filter may be repeatedly cleaned with any form of a variety of solvents and used almost indefinitely.

BRIEF DESCRIPTION OF THE DRAWING

In the drawing, FIG. 1 is a perspective view of the filter, having its outer frame partially opened and removed from the filter element, with one end of said element having its outer casings and inner core drawn apart to expose its layered construction;

FIG. 2 provides a plan view of the filter; the

FIG. 3 is a vertical section taken along the line 3—3 of FIG. 2, showing the depth of corrugation of the filter element;

FIG. 4 is a transverse section taken along the line 4—4 of FIG. 2, also showing the depth of corrugation of the filter element as encased within the outer frame; and FIG. 5 provides an enlarged view of one end of the filter disclosed in the sectional view of FIG. 4.

DESCRIPTION OF THE PREFERRED EMBODIMENT

Referring now to the drawing for one illustrative embodiment of the filter of this invention, reference numeral 1 generally depicts the filter comprising a frame or framework 2 which is disposed for encasing the marginal edges of a filter element 3. The filter element of this invention is herein shown constructed having a pair of outer casings or coverings 4 and 5 which are formed in contiguity with and provide the surfaces and support for the inner core 6 of said element.

The frame 2 is generally constructed of a stiffened material, such as aluminum or other metal, or even a sturdy plastic, which provides structural reinforcement for the entire filter. The frame is formed having an almost continuous web 7 which protectingly surrounds the outer marginal edges of the frame element 3, thereby preventing anyone during handling of the filter from being cut or damaged by means of contacting the rough edges of said element, with said frame further having a pair of integral flanges 8 and 9 which extend angularly inwardly from said web and therein confine the filter element within said frame. The frame is generally formed from a unitary blank of the material, and its corner portions are angularly bevelled, as at 10, so that the required degree bend may be made in the frame to allow for the formation of a corner. The terminal ends of the frame, as at 11 and 12, are arranged for connecting together by means of the tab 13 which may be fastened to the end 7 through the use of any form of a connector, such as a common rivet. The tab 13 merely inserts into contiguity with the inner surface of the web 7, with the rivet being connected through the aperture 14, and also the corresponding aperture 15 formed proximate the frame end 7. Hence, when the frame and filter element have been joined together into the formation of the filter, said filter will comprise a unitary structure having enchanced strength and which may be repeatedly utilized in a filtering operation. See also FIG. 2.

The filter element 3 of the invention, as previously described, comprises the outer casings 4 and 5, and includes an inner core 6, which casings and core may be constructed of any material which adequately filters dirt or dust particles from air, or other similar-type undesirable particles from a variety of fluids, but preferably, these parts are constructed of a metal, such as aluminum, therefore being light in weight, but also being as sufficiently rigid and substantially strong so as to be repeatedly used after many cleanings, a concept which ordinarily has not been recognized in the filter art. By referring also to FIG. 5, it can be seen that the outer casings 4 and 5 of the filter element are formed from a sheet of metallic material, such as aluminum foil, and is preferably constructed in the manner of expanded metal, so as to allow freedom of penetration of any flowing material, such as air or a fluid, therethrough to be subjected to filtration. In one embodiment, a filter has been constructed utilizing aluminum of approximately 0.015 inch in thickness for the outer casings which substantially rigidified both the filter element, and the entire filter, and since the aluminum was constructed as expanded metal sheets it presented no hindrance to the free passage of flowing air therethrough. The inner core 6 of the filter element comprises multiple layers of a metallic material, such as expanded aluminum sheets having, for example, 0.002 inch thickness, which are superimposed one upon the other to provide an overall thickness in a core which adequately provides for filtration of dirt or other particles from air or the like. In the example embodiment, these layers of the inner core were constructed of 0.002 inch sheet aluminum which was also delicately expanded to allow for penetration and passage of air therethrough, but through the superimposed of many layers, one upon the other, they effectively achieved filtration of the dirt particles that were entrained within the air. Naturally, the exact quantity of layers of metallic foil utilized in the inner core segment 6 of the invention depends upon the degree of filtration required and the nature of the flowable material being filtered. In some embodiments, six layers of foil have been found useful to achieve effective filtering, whereas in other filters constructed in accordance with the teachings of this invention 15 layers of superimposed metallic foil have been found useful.

Although the inner core 6 of this filter element has been described as formed from layers of expanded aluminum foil, it has been found that various other types of foraminous metal, in addition to metal turnings or shavings as acquired from a machine shop lathe operation have been effective in operating as the filtering segment of this type filter. Expanded metal foil has been found both effective and the easiest type of inner core to construct under the process of this invention.

As shown in FIGS. 3 and 4, it can be seen that the filter element of this invention is constructed rather sinuous or serpentine in configuration, including a series of alternating mounds 16 and depressions 17 throughout its width. This arrangement in the filter element is achieved through the further processing of the combination inner core and outer casings through a corrugating machine, which continuously molds the element into the pattern desired. The formation of the filter element into this configuration is desirable for two-fold reasons. Initially the filter element constructed having corrugations formed of metallic material adds significantly to the strength of the filter when finally assembled, and may be utilized to filter flowable material, such as air or other fluids passing at extreme velocities, whereas filters constructed of the common fibers or paper would generally rapidly deteriorate under such forces. Furthermore, the formation of a sinuous surface in a filter element significantly increases the actual surface area of the element which thereby allows the size of the filter to be reduced, while yet providing for the same capacity of filtration as may be achieved through the use of a larger constructed filter having the same surface area but including a filter element of the flat and planar design. Thus, the air or other fluid to be filtered can more easily pass through a filter of this design, and yet effectively have its impurities separated therefrom by the inner core of the element.

It should be noted that although this filter 1 includes a frame 2 for the purpose of adding structural support to the member, once the layers of the inner core 6 and its outer casings have passed through a corrugating machine, and as the same is cut to the dimensions desired in a filter, the force of the shear in cutting said element induces a pressure bonding or binding of the metallic components together thereby forming them into a somewhat integral unit which maintains its integrity regardless whether it be confined within the frame 2 or otherwise. Thus, it can be seen that the filter element 2 of this device, as constructed from an aluminum foil or other metal, is of significant structural strength in and of its own, and with the addition of a frame around its marginal edges, it is substantially strengthened to withstand even the roughest of filtering operations.

In the process of constructing the filter of this invention, an outer casing of expanded metal is first disposed so that a series of layers of a filtering element are deposited thereon with the upper casing 4 then being brought into place. Obviously this process may be operated continuously in a manner common to lamination art, wherein a series of properly disposed rolls of the various metallic materials may be collated to form a continuous length of filter element. The length of superimposed components are then fed into a corrugating machine which will form the type of surface design in the entire filter element as desired, such as the sinuous design as disclosed in the drawing of this invention. Upon exiting of the formed filter element from the corrugating machine, said element is then sheared to the dimensions desired, which cutting simultaneously pressure bonds the edges of the filter element into an integral like unit. Then, the frame 2 is formed into that size and design to provide for enhanced structural support around the marginal edges of the filter element, while properly shielding its rough edges from exposure. Finally, a rivet or other means of connection provides for attachment of the tab 13 of end 12 of the frame to its proximate end 11 to form the filter into a complete unit. The completed filter constructed in accordance with the teachings of this invention is of significant strength, will resist rough handling, and is effective in use for a long period of time. After the filter becomes soiled through continuous usage, and since it is constructed of various metals, it may be removed from its operative position and bathed in a variety of solvents which will effective dissolve or remove the captured dirt particles or the like from within the filter. After such a cleaning the entire filter may be once again used in a filtering operation as before. Obviously a filter constructed in this manner may be repeatedly used after many cleanings.

Numerous variations in the construction of the filter of this invention, within the scope of the appended claims, will occur to those skilled in the art in the light of the foregoing disclosure. For example, foraminous sheets of foil or metal may be used in place of expanded metal in the outer casings and inner core portion of the filter element. These are merely illustrative.

I claim:

1. A filter for removing entrained matter from a flowing material comprising a frame of rigid construction and of a configuration to provide structural support around the marginal edges of a filter element encased therein, said filter element having an inner core of metallic filtering composition and arranged to preclude passage of the entrained matter, outer coverings providing a pervious sheath affixed upon and overlying either side of the inner core and furnishing rigidity to the filter element, the cutting of the filter element into desired shapes compressing the severed edges of the inner core and contiguous outer coverings into a pressure-bonded edge that retains its integrity when separated from its frame, said filter element including the inner core and outer coverings being corrugated to increase its surface area exposure to the flowing material, said outer coverings of the filter element being formed from expanded metal thereby enhancing its rigidity allowing unencumbered movement of the flowing material therethrough, the inner core of metallic filtering composition comprising multiple layers of metallic material, said layers of metallic material being of a lesser thickness than the expanded metal forming the outer covering of the filter element, said frame providing support around the filter element being formed having a web portion that shields the rough marginal pressure-bonded edges of the inner core and outer coverings, flange portions bent integrally from said web portions and providing confinement for said filter element, and a rivet means connecting the two free ends of the integral frame together at one corner, the remaining corners of said frame being of integral construction.

2. The filter of claim 1 wherein the inner core of the metallic filtering composition comprises a thickness of an agglomeration of metallic turning encased intermediate the outer coverings of said filter element, said metallic turnings being confined therein by said outer coverings and the pressure-bonded edges of the filter element when severed into the desired configuration of the filter.

* * * * *